(12) United States Patent
Ferrell et al.

(10) Patent No.: US 10,436,813 B1
(45) Date of Patent: Oct. 8, 2019

(54) SURFACE PLASMON SCANNING-TUNNELING CHEMICAL MAPPING (SPSTM) SYSTEM

(71) Applicant: Institute for Electronics and Information Technology in Tianjin Tsinghua University, Zhongxin Tianjin eco (CN)

(72) Inventors: Thomas L. Ferrell, Knoxville, TN (US); Gong Gu, Knoxville, TN (US); Vineet K. Khullar, Knoxville, TN (US); Ali Passian, Knoxville, TN (US)

(73) Assignee: Institute for Electronics and Information Technology in Tianjin Tsinghua University, Tianjin (CN)

( * ) Notice: Subject to any disclaimer, the term of this patent is extended or adjusted under 35 U.S.C. 154(b) by 0 days.

(21) Appl. No.: 15/975,228

(22) Filed: May 9, 2018

(51) Int. Cl.
*G01Q 60/16* (2010.01)
(52) U.S. Cl.
CPC .................................. *G01Q 60/16* (2013.01)
(58) Field of Classification Search
CPC ....................................................... G01Q 60/16
USPC ............... 850/1, 2, 3, 28, 52, 56, 57, 58, 59
See application file for complete search history.

(56) References Cited

U.S. PATENT DOCUMENTS

| 5,018,865 A | 5/1991 | Ferrell et al. | |
|---|---|---|---|
| 2003/0030817 A1* | 2/2003 | Lee | G01B 11/00 356/491 |
| 2003/0206708 A1* | 11/2003 | Estes | B82Y 20/00 385/130 |
| 2005/0128886 A1* | 6/2005 | Ogawa | B82Y 10/00 369/13.33 |

(Continued)

FOREIGN PATENT DOCUMENTS

EP 0308537 A1 3/1989

OTHER PUBLICATIONS

Ferrell; Thin-foil surface-plasmon modification in scanning-probe microscopy; Rapid Communications; Nov. 15, 1994; 4 pages; vol. 50—No. 19; copyright 1994 The American Physical Society.

(Continued)

*Primary Examiner* — Nicole M Ippolito
(74) *Attorney, Agent, or Firm* — Taft Stettinius & Hollister LLP (57) ABSTRACT

A Surface Plasmon Scanning-Tunneling Chemical Mapping (SPSTM) system is disclosed that determines identification characteristics of a target material. An optical beam source launches an optical beam that propagates through a transparent optical element to a material layer to excite surface plasmons of the material layer. An optical probe with a nanometer-sized tip is positioned over a nanometer-sized region of the target material, which is positioned on the material layer, to measure a probe signal associated only with the surface plasmons that tunnel from the material layer through the nanometer-sized region of the target material and collected by the optical probe. An optical property analyzer is configured to determine at least one optical property associated with the nanometer-sized region based on the probe signal associated with the surface plasmons collected by the optical probe. The optical properties identify identification characteristics associated with the nanometer-sized region of the target material.

20 Claims, 4 Drawing Sheets

(56) References Cited

U.S. PATENT DOCUMENTS

| | | | | |
|---|---|---|---|---|
| 2009/0020426 | A1* | 1/2009 | Thundat | B01L 3/50273 |
| | | | | 204/450 |
| 2011/0250406 | A1* | 10/2011 | Zia | C09K 11/02 |
| | | | | 428/174 |
| 2016/0314867 | A1* | 10/2016 | Kabakchiev | B82Y 10/00 |
| 2018/0238806 | A1* | 8/2018 | Zhang | G01N 21/658 |

OTHER PUBLICATIONS

Reddick et al.; New form of scanning optical microscopy; Rapid Communications; Jan. 1, 1989; 6 pages; vol. 39—No. 1; copyright 1989 The American Physical Society.

Ritchie; Plasma Losses by Fast Electrons in Thin Films; Physical Review; Jun. 1, 1957; 8 pages; vol. 106—No. 5.

Pohl et al.; Optical stethoscopy: Image recording with resolution λ20; Applied Physics Letters; Apr. 1, 1984; 4 pages; vol. 44—No. 7; copyright 1984 American Institute of Physics.

Betzig et al.; Combined shear force and near-field scanning optical microscopy; Applied Physics Letters; May 18, 1992; 4 pages; vol. 60—No. 20; copyright 1992 American Institute of Physics.

Ferrell et al.; The photon scanning tunneling microscope; Journal of Vaccum Science & Technology B: Microelectronics and Nanometer Structures Processing, Measurement, and Phenomena; Mar./Apr. 1991; 7 pages; vol. 9—No. 2; copyright 1991 American Vaccum Society.

Khullar et al.; Local Nanoscale Measurements of Optical Properties Using Surface Plasmon Tunneling; 4 pages.

Binnig et al.; Atomic Force Microscope; Physical Review Letters; Mar. 3, 1986; 5 pages; vol. 56—No. 9.

Binning et al.; The Scanning Tunneling Microscope; Scientific American; Aug. 1985; 10 pages; vol. 253—No. 2; Scientific American, a division of Nature America, Inc.

Sharp et al.; Spectroscopy and Imaging Using the Photon Scanning-Tunneling Microscope; Acc. Chem. Res.; 1993, 6 pages; vol. 26—No. 7; copyright 1993 American Chemical Society.

Jackson; Simple Radiating Systems, Scattering, and Diffraction; Classical Electrodynamics; 7 pages; chapter 9—section 1; John Wiley & Sons, Inc.; New York, London, Sydney, Toronto.

Palik; Handbook of Optical Constants of Solids; Academic Press Handbook Series; 1985; 3 pages; Academic Press, Inc. (Harcourt Brace Jovanovich, Publishers); Orlando, San Diego, New York, London, Toronto, Montreal, Sydney, Tokoyo.

Raether; Surface Plasmons on Smooth and Rough Surfaces and on Gratings; Springer Tracts in Modem Physics; 5 pages; vol. 111; chapter 2—section 1; Springer-Verlag; Berlin, Heidelberg, New York, London, Paris, Tokyo.

Binnig et al.; Scanning tunneling microscopy; Helvetica Physica Acto; 1982; 11 pages; vol. 55; Birkhauser Verlag Basel, 1982.

Berndt et al.; Inelastic Tunneling Excitation of Tip-Induced Plasmon Modes on Noble-Metal Surfaces; Physical Review Letters; Dec. 30, 1991; 5 pages; vol. 67—No. 27; copyright 1991 The American Physical Society.

Coombs et al.; Fine structure in field emission resonances at surfaces; Journal of Microscopy; Dec. 1988; 11 pages; vol. 152.

Trautman et al.; Near-field spectroscopy of single molecules at room temperature; Letters to Nature; May 5, 1994; 3 pages; vol. 369; copyright Nature Publishing Group.

Ferrell et al.; Plasmons and Surfaces; American Scientist; Jul.-Aug. 1985; 11 pages; vol. 73—No. 4; Sigma Xi, The Scientific Research Honor Society.

Wessel; Surface-enhanced optical microscopy; J. Opt. Soc. Am. B; Sep. 1985; 4 pages; vol. 2—No. 9; copyright 1985 Optical Society of America.

Synge; A suggested method for extending microscopic resolution into the ultra-microscopic region; The London, Edinburgh and Dublin philosophical magazine and journal of science; 1928; 7 pages; Serial 7—vol. 6; London, Taylor & Francis Ltd.

Rothenhausler et al.; Surface-plasmon microscopy; Letters to Nature; Apr. 14, 1988; 3 pages; vol. 332.

Hickel et al.; Surface Plasmon Microscopy of Lipid Layers; Thin Solid Films; 1990; 8 pages; vol. 187; copyright Elsevier Sequoia/ Printed in the Netherlands.

Kretschmann, The Determination of the Optical Constants of Metals by Excitation of Surface Plasmons, Z. Physik, 1971, 12 pages, vol. 241, copyright by Springer-Verlag 1971.

Kretschmann, The ATR Method with Focused Light—Application to Guided Waves on a Grating, Optics Communications, Jul. 1978, 4 pages, vol. 26—No. 1.

Okamoto et al., Surface plasmon micrscope with an electronic angular scanning, Optics Communications, 1992, 6 pages, vol. 93, copyright 1992 Elsevier Science Publishers B.V.

DeBono et al., Concanavalin A and Polysaccharide on Gold Surfaces, Biosensor Design and Application, 16 pages, copyright 1992 American Chemical Society.

Morgan et al., A surface plasmon resonance immunosensor based on the streptavidin-biotin complex, Biosensors & Bioelectronics, 1992, 6 pages, vol. 7, copyright 1992 Elsevier Science Publishers Ltd.

Haussling et al., Biotin-Functionalized Self-Assembled Monolayers on Gold: Surface Plasmon Optical Studies of Specific Recognition Reactions, Langmuir The ACS Journal of Surfaces and Colloids, Sep. 1991, 4 pages, vol. 7—No. 9, copyright 1991 American Chemical Society.

Sievers et al., Enhanced surface plasmon resonance inhibition test (ESPRIT) using latex particles, Biosensors & Bioelectronics, 1993, 6 pages, vol. 8, copyright 1993 Elsevier Science Publishers Ltd.

Lukosz, Principles and sensitivites of integrated optical and surface plasmon sensors for direct affinity sensing and immunosensing, Biosensors & Bioelectronics, 1991, 11 pages, vol. 6, copyright 1991 Elsevier Science Publishers Ltd., England. Printed in Great Britain.

Gimzewski et al., Enhanced Photon Emission in Scanning Tunnelling Microscopy, Europhysics Letters, Mar. 1, 1989, 7 pages, vol. 8—No. 5.

Sivel et al., Photon emission stimulated by scanning tunneling microscopy in air, Physical Review B, Apr. 15, 1992, 4 pages, vol. 45—No. 15, copyright 1992 The American Physical Society.

McKinnon et al., Photon-emission scanning tunneling microscopy of silver films in ultrahigh vacuum: A spectroscopic method, Physical Review B, Nov. 15, 1993, 8 pages, vol. 48—No. 20, copyright 1993 The American Physical Society.

Specht et al., Scanning Plasmon Near-Field Microscope, Physical Review Letters, Jan. 27, 1992, 6 pages, vol. 68—No. 4, copyright 1992 The American Physical Society.

Rabe et al., High-resolution charaterization of piezoelectric ceramics by ultrasonic scanning force microscopy techniques, Journal of Physics D: Applied Physics, Oct. 8, 2002, 16 pages, vol. 35, copyright 2002 IOP Publishing Ltd Printed in the UK.

* cited by examiner

SURFACE PLASMON SCANNING-TUNNELING CHEMICAL MAPPING (SPSTM) SYSTEM

BACKGROUND

Field of Disclosure

The present disclosure relates generally to the determination of optical properties for a target material.

Related Art

Conventional approaches to optically identifying a target material typically involve the illuminating of the target material with an optical beam. The response of the target material to the optical beam is typically unique to the target material and not replicated by any other target material. The response of the target material to the optical beam also results from the optical properties of the optical beam that are unique to the target material and not replicated by any other material. Conventional approaches identify the optical properties by resulting in the response of the target material to the optical beam and infer from the optical properties identification characteristics of the material. Identification characteristics, such as chemical information and/or structure of the target material, are then incorporated by the conventional approaches to identify the target material.

Conventional approaches incorporate a Kretschmann configuration where an optical beam is launched into a hemi-cylindrical lens or prism at a first angle such that the reflected beam intensity is minimized. The target material is then positioned on the hemi-cylindrical lens or prism and the optical beam is again launched into the cylindrical lens at a second angle such that the reflected beam intensity is minimized. The optical properties of the target material are then determined based on the difference between the first angle and the second angle. However, the thus acquired optical properties are averaged for the area of the target material where the optical beam illuminates. If the illuminated area includes portions of the target material that differ, such as different chemical structure, and/or the illuminated area also includes empty space that is not part of the target material, then the averaged optical properties are inaccurate and may result in incorrectly identifying the target material.

Conventional approaches also include far-field spectroscopic and/or microscopic configurations, which are subject to the diffraction limit. Therefore, the resolution of the image of the target material illuminated by the optical beam as detected by the microscope is limited to the wavelength of the optical beam as well as the size of the aperture of the microscope. A decreased resolution in the images of the target material reduces the accuracy in identifying the target material, particularly portions of the target material that differ in chemical structure and/or includes empty space. The conventional Near-Field Scanning Optical Microscope (NSOM), although circumventing the diffraction limit by leveraging near-field optics, also represents a conventional approach. One important disadvantage of NSOM, however, is that near-field optics fail to determine and/or control the distance of the probe from the target material. Rather, an external approach to determine the distance of the probe from the target material is employed resulting in a decreased accuracy in the distance determination.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

SPSTM System

Figure 1:
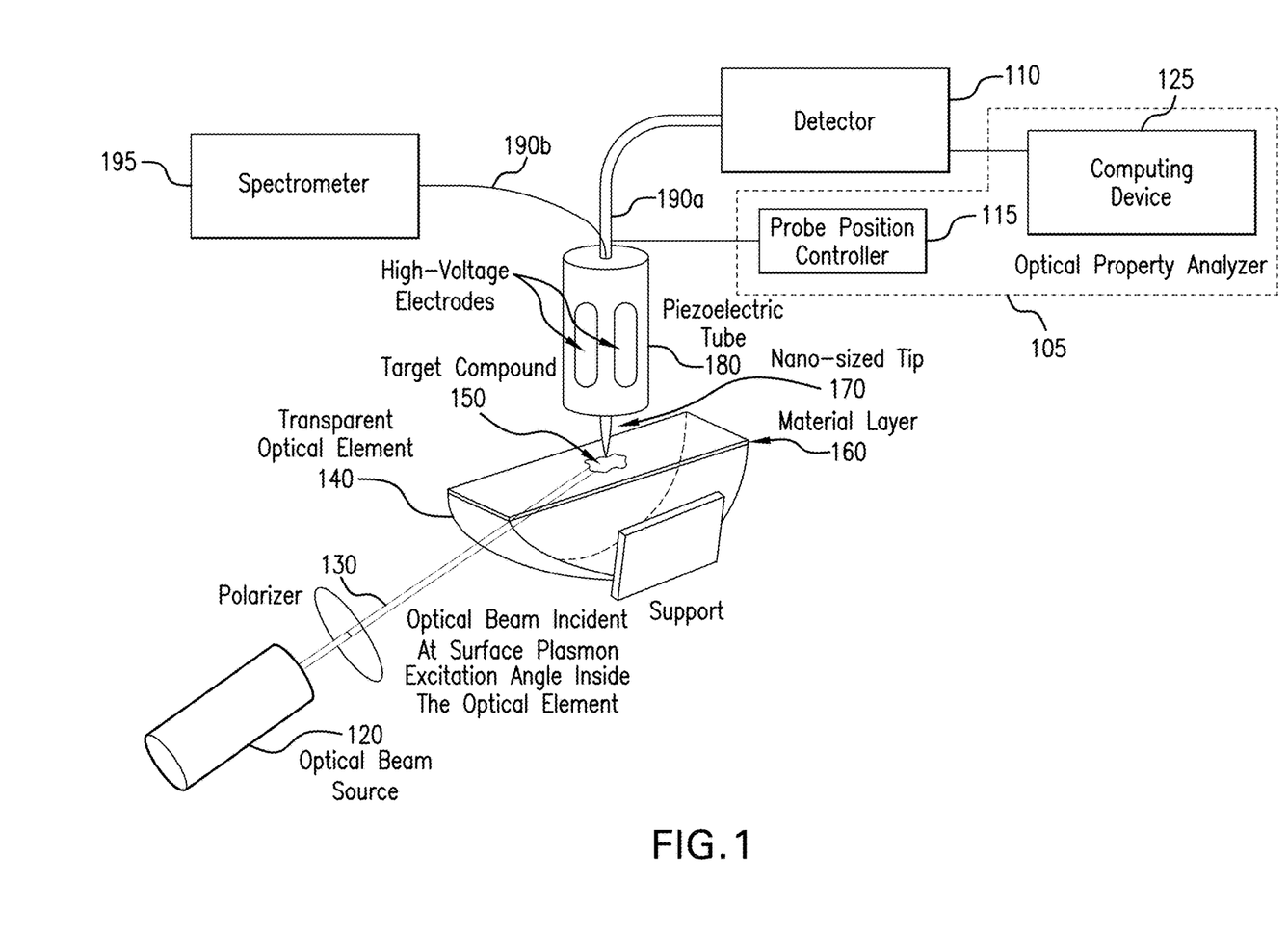
FIG. 1 is a schematic diagram of an exemplary SPSTM system according to an exemplary embodiment of the present disclosure.

FIG. 1 is a schematic diagram of an exemplary SPSTM system according to an exemplary embodiment of the present disclosure. The SPSTM system 100 may determine optical properties associated with a nanometer-sized region of a target material 150 and in turn may identify the nanometer-sized region of the target material 150 based on the optical properties of the nanometer-sized region. The SPSTM system 100 may determine the optical properties of the nanometer-sized region by launching an optical beam 130 into a transparent optical element 140 so that the optical beam 130 excites surface plasmons of the material layer 160. An optical probe 170 with a nanometer-sized tip that is positioned over the nanometer-sized region. The surface plasmons may tunnel from the material layer 160 through the nanometer-sized region and are then captured by the optical probe 170. The surface plasmons may then decay into photons and the photons may be guided by the optical fiber 190(a-b) to the photon detector 110 that produces an electrical signal. The optical probe 170 thus acquires a probe signal associated with the surface plasmons that tunnel from the material layer 160 through the nanometer-sized region of the target material 150 to the nanometer-sized tip of the optical probe 170. An optical property analyzer 115 may then determine the optical properties of the nanometer-sized region based on the probe signal and identify the nanometer-sized region of the target material 150 based on the optical properties.

The SPSTM system 100 includes an optical beam source 120 that launches the optical beam 130 into the transparent optical element 140. The material layer 160 is positioned on the transparent optical element 140 and the target material 150 is positioned on the material layer 160. The nanometer-sized tip of the optical probe 170 is positioned over the nanometer-sized region of the target material 150. An optical probe assembly includes the optical probe 170 that may be affixed to a set of piezoelectric tubes 180. An optical fiber 190(a-b) may be bifurcated such that a first branch 190a of the optical fiber 190(a-b) is coupled to a detector 110 and the second branch 190b may be directed to a spectrometer 195 when additional spectroscopic information is desired and an additional light source may be utilized to incorporate the spectrometer 195. After the surface plasmons tunnel into the nanometer-sized tip of the optical probe 170, the surface plasmons convert into photons. The photons then propagate into the optical fiber 190(a-b) and branch to the detector 110, resulting in a probe signal to be received and analyzed by the optical property analyzer 105. The optical property analyzer 105 may include the probe position controller 115 and the computing device 125. The probe position controller 115 may control the scan of the nanometer-sized tip of the optical probe 170 thereby enabling the SPSTM system 100 to determine the optical properties associated with the probed nanometer-sized region of the target material 150 and thus to identify the target material in the nanometer-sized region based on the localized optical properties.

The optical beam source 120 may launch the optical beam 130 through the transparent optical element 140 at a surface plasmon excitation angle to the material layer 160 that is positioned on the transparent optical element 140 to excite a plurality of surface plasmons of the material layer 160. The optical beam source 120 may include but is not limited to a laser, a white light source, and/or any other type of optical beam source that emits a light beam that is sufficient to excite surface plasmons of the material layer 160 that will be apparent to those skilled in the relevant art(s) without departing from the spirit and scope of the disclosure. The optical beam 130 may include but is not limited to a laser light beam, a white light beam and/or any other type of optical beam that is sufficient to excite surface plasmons of the material layer 160 that will be apparent to those skilled in the relevant art(s) without departing from the spirit and scope of the disclosure.

The transparent optical element 140 may include but is not limited to a transparent hemi-cylinder, hem-sphere, a prism, and/or any other type of optical element that is sufficient to allow the optical beam 130 to propagate through the optical element and excite surface plasmons of the material layer 160 that will be apparent to those skilled in the relevant art(s) without departing from the spirit and scope of the disclosure.

The incident optical beam source 120 may launch the optical beam 130 into the transparent optical element 140 at the surface plasmon excitation angle. The surface plasmon excitation angle is the angle at which the incident optical beam 130 propagates through the transparent optical element 140 to the material layer 160 to excite surface plasmons of the material layer 160. The reflection of the incident optical beam 130 is significantly decreased and/or may disappear when the incident optical beam 130 is launched at the surface plasmon excitation angle with regard to reflection of the incident optical beam 130 when the incident optical beam is launched at an incident angle that is not the surface plasmon excitation angle. Launched at the surface plasmon excitation angle, the optical beam 130 loses energy to the surface plasmons of the material layer 160. The optical beam source 120 launching the optical beam 130 into the transparent optical element 140 at an angle that differs from the surface plasmon excitation angle may fail to excite surface plasmons in the material layer 160 and may rather be reflected.

The material layer 160 may be positioned on the transparent optical element 140. In an embodiment, the material layer 160 may be positioned on the surface of the transparent optical element 140 that is to be illuminated by the optical beam source 120 and hereafter referred to as the top surface of the transparent optical element 140. In positioning the material layer 160 on the top surface of the transparent optical element 140, the optical beam source 120 may be able to sufficiently launch the optical beam 130 at the surface plasmon excitation angle to sufficiently excite surface plasmons in the material layer 160. The material layer 160 may be positioned at any position of the transparent optical element 140 that is sufficient for the optical beam source 120 to launch the optical beam 130 at the surface plasmon excitation angle to sufficiently excite surface plasmons at the material layer 160 that will be apparent to those skilled in the relevant art(s) without departing from the spirit and scope of the disclosure.

The material layer 160 may be a material that when excited by the optical beam 130 at the surface plasmon excitation angle engenders surface plasmons of the material layer 160 surface. For example, the material layer 160 may be a metallic material thin film. The metallic material may be excited by the optical beam 130 at the surface plasmon excitation angle and the electron density at the surface of the metallic layer may oscillate. A quantum of such energy density oscillation is referred to as a surface plasmon. In an embodiment, the material layer 160 may be gold, silver, aluminum, a two-dimensional material, and/or any other type of material that may engender surface plasmons when excited by the optical beam 130 at the surface plasmon angle.

The optical probe 170 may include a nanometer-sized tip that may range from 1.0 to several hundred nanometers and may be positioned so that the probing may be localized to a nanometer-sized region of the target material 150. The probe signal may be dominated by contributions from surface plasmons that tunnel from the material layer 160 to the nanometer-sized tip through the nanometer-sized region that is adjacent to the nanometer-sized tip. The optical probe 170 may measure the probe signal associated with the surface plasmons that tunnel from the material layer 160 through the nanometer-sized region of the target material 150 and are collected by the optical probe 170. In an embodiment, the nanometer-sized tip of the optical probe 170 is localized to the nanometer-sized region when nanometer-sized tip of the optical probe 170 fails to measure probe signals associated with surface plasmons that are tunneled from outside of the nanometer-sized region. The tunneling from outside of the nanometer-sized region to the nanometer-sized tip may be limited due to the optical probe 170 being sloped on its sides and thus exponentially fewer surface plasmons tunneling through the target material 150 outside of the adjacent nanometer-sized region contribute to the probe signal. The probe signal may be an exponential signal, in that its intensity may decay exponentially as the nanometer-sized tip moves away perpendicularly from the target material, and/or any other type of signal that may be dominated by contributions from surface plasmons that tunnel to the nanometer-sized tip and may be measured by the optical probe 170 that will be apparent to those skilled in the relevant art(s) without departing from the spirit and scope of the disclosure.

The target material 150 may be a material that includes identification characteristics that are unique to the target material 150 that a user may request to identify. For example, a user may request to determine the chemical composition of a specific biomedical sample. The biomedical sample is the target material 150 the chemical composition may be identified by comparing the obtained optical properties to the known optical properties of known chemicals.

The target material 150 may be positioned on the material layer 160 such that the surface plasmons of the material layer 160 excited by the optical beam 130 launched at the surface plasmon excitation angle by the optical beam source 120 may tunnel through the target material 150 and may be collected by the optical probe 170. In an embodiment, the target material 150 may be positioned on a top surface of the material layer 160 that faces the optical probe 170 while a bottom surface of the material layer 160 faces the transparent optical element 140 such that the surface plasmons of the material layer 160 may tunnel through the target material 150 and may be collected by the optical probe 170 when the surface plasmons are excited at the material layer 160.

The optical probe 170 is an optical probe that is capable of converting the surface plasmons of the material layer 160 that that tunnel from the material layer 160 to the metallic material of the optical probe 170 to photons. After converting the surface plasmons to photons, the optical probe 170 is also capable of guiding the photons to the detector 110.

As noted above, the optical beam 130 launched at the surface plasmon excitation angle may excite surface plasmons of the material layer 160. The surface plasmons may then tunnel from the material layer 160 through the target material 150 and may be collected by the optical probe 170 when the optical probe 170 is coated with a material that hosts the surface plasmons tunneling from the material layer 160. For example, the optical probe may be coated with a metallic material in that metallic materials are typically conductive and may host surface plasmons that are excited in the material layer 160 and enable the surface plasmons to tunnel from the material layer 160 through the target material 150 and be collected by the optical probe 170. In an embodiment, the optical probe 170 may be coated with a metallic material that may include but is not limited to gold, silver, aluminum, a two-dimensional material, and/or any other type of material that may host the surface plasmons tunneling from the material layer 160 and enable the surface plasmons to tunnel from the material layer 160 through the target material 150 and be collected by the optical probe 170 that will be apparent to those skilled in the relevant art(s) without departing from the spirit and scope of the disclosure.

Figure 2:
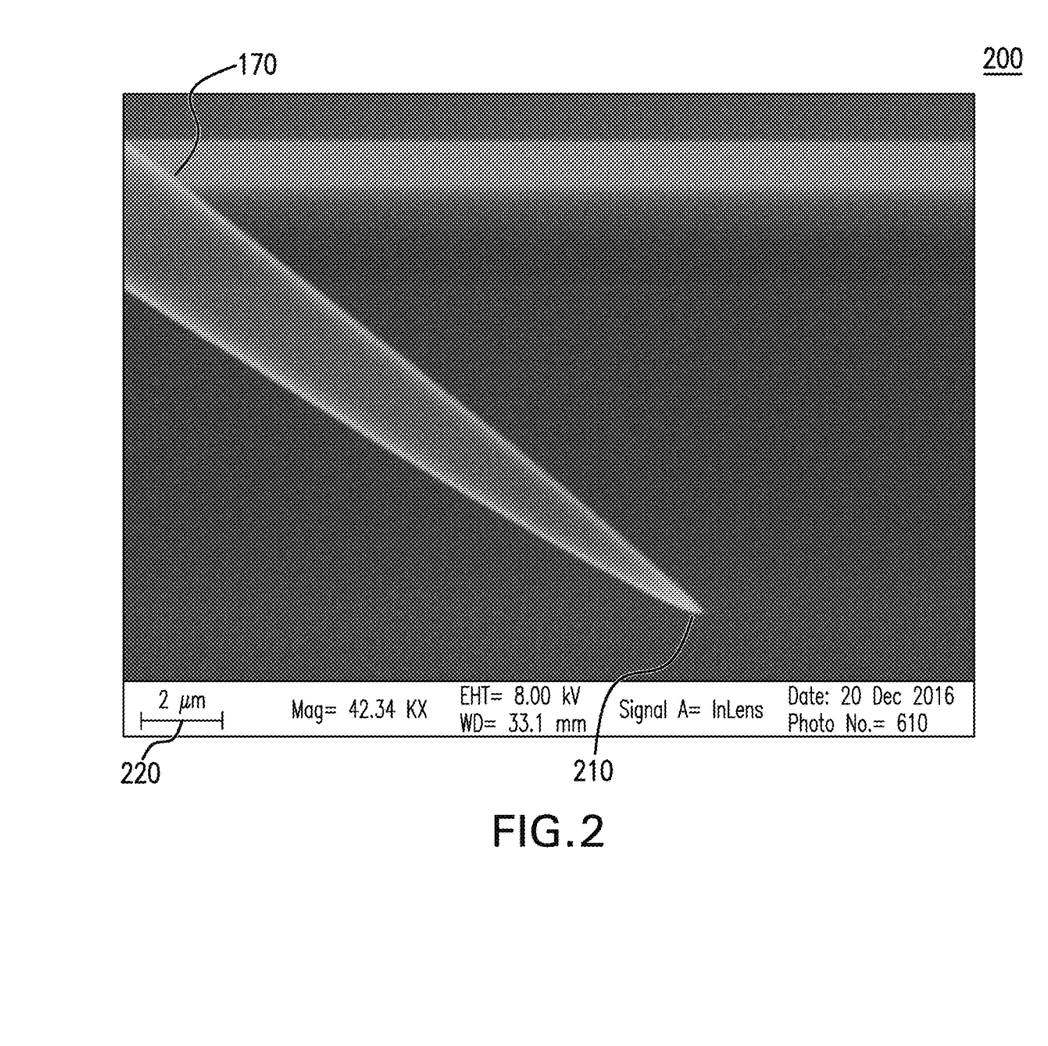
FIG. 2 illustrates an isometric view of the optical probe that includes a nanometer-sized tip according to an exemplary embodiment of the present disclosure.

The optical probe 170 may include a nanometer-sized tip and the nanometer-sized tip may be positioned so that the plasmon tunneling may be localized to a nanometer-sized region of the target material 150. FIG. 2 illustrates a micrograph view of the optical probe 170 that includes a nanometer-sized tip 210 as depicted in FIG. 2 with a 2.0 micrometer scale bar 220. The optical probe 170 may collect surface plasmons that tunnel from the material layer 160 through a nanometer-sized region of the target material 150. The nanometer-sized region of the target material 150 may be a region that is sized on the nano-scale in that the nanometer-sized region may range from 0.1 nanometers to 1000 nanometers. In an embodiment, the nanometer-sized region that the optical probe 170 may collect surface plasmons that tunnel through the nanometer-sized region of the target material 150 from the material layer 160 may be a circular region that has a nanometer-sized radius. Rather than collecting surface plasmons that tunnel from the material layer 150 through regions of the target material 150 outside a nanometer-sized region of the target material 150, the optical probe 170 may isolate the surface plasmons that tunnel through a nanometer-sized region of the target material 150.

In doing so, the optical probe 170 may isolate the surface plasmons that are collected to the surface plasmons that tunnel through a nanometer-sized region of the target material 150 that may include identification characteristics that differ from regions of the target material 150 that are outside of the nanometer-sized region of the target material 150. The target material 150 may have identification characteristics that differ throughout the target material 150. For example, the target material 150 may have regions that have identification characteristics at the molecular level that differ from other regions of the target material 150 such as a biomedical sample may have different proteins located in different positions of the target material 150.

In isolating the surface plasmons that are collected to the surface plasmons that tunnel through the nanometer-sized region of the target material 150, the optical probe 170 increases the likelihood that the surface plasmons that are collected are unique to the nanometer-sized region of the target material 150 rather than including surface plasmons that are unique to other nanometer-sized regions. For example, the optical probe 170 may isolate the surface plasmons that are collected to the surface plasmons that tunnel through a nanometer-sized region of the target material 150 that is occupied by a first protein while excluding surface plasmons from being tunneled from outside the nanometer-sized region of the target material 150 that is occupied by a second protein.

The optical probe 170 may isolate the surface plasmons that are collected to the surface plasmons that tunnel through the nanometer-sized region of the target material 150 with a nanometer-sized tip 210 that is localized to the nanometer-sized region of the target material 150. The nanometer-sized tip 210 may be sharpened such that the nanometer-sized tip 210 may terminate to a tip that includes a diameter on the nano-scale which is 1.0 nanometer to 100 nanometers. In an embodiment, nanometer-sized tip 210 may be sharpened to a tip that includes a diameter of 10 nanometers. As shown in FIG. 2, an example embodiment is shown that depicts the optical probe 170 with a nanometer-sized tip 210 on a 2.0 micrometer scale 220. Thus, the optical probe 170 may be positioned so that the probing by the nanometer-sized tip 210 is localized to the nanometer-sized region of the target material 150 and prevented from collecting surface plasmons that are tunneled through portions of the target material 150 that are outside of the nanometer-sized region.

The optical probe 170 may also measure an exponential signal associated with the surface plasmons that tunnel from the material layer 160 through the nanometer-sized region of the target material 150 and are collected by the optical probe 170. The exponential signal decreases exponentially as the perpendicular distance between the nanometer-sized tip 210 and a top surface of the nanometer-sized region of the target material 150 where the top surface of the nanometer-sized region of the target material is opposite the bottom surface of the target material 150 that is positioned on the material layer 160. As the surface plasmons tunnel from the material layer 160 through the nanometer-sized region of the target material 150 and are collected by the optical probe 170, an exponential signal is generated by those surface plasmons that may be measured by the optical probe 170.

The nanometer-sized tip 210 of the optical probe 170 may be positioned a perpendicular distance from the top surface of the nanometer-sized region. In doing so, the nanometer-sized tip 210 of the optical probe 170 may be positioned perpendicular to the top surface of the nanometer-sized region of the target material 150. The nanometer-sized tip 210 may also be positioned a distance from the top surface of the nanometer-sized region so that the optical probe 170 may measure the exponential signal generated by the tunneling of surface plasmons from the material layer 160 through the nanometer-sized region before the exponential signal decays and may no longer be measured by the optical probe 170 such that the contribution from the tunneling surface plasmons through the target material 150 outside of the nanometer-sized region are not detectable due to the exponential dependence on the perpendicular distance by the exponential signal.

In doing so, the nanometer-sized tip 210 may be positioned a perpendicular distance from the top surface of the nanometer-sized region on the nanometer-scale where the nanometer-sized tip 210 may be positioned a range of 1.0 nanometer to 100 nanometers from the top-surface of the nanometer-sized region. The signal generated by the tunneling of surface plasmons from the material layer through the nanometer-sized region may deviate from an exponential signal when the nanometer-sized tip 210 is positioned a perpendicular distance from the top surface of the nanometer-sized region of less than 2.0 nanometers. In an embodiment, the nanometer-sized tip 210 may be positioned a perpendicular distance from the top surface of the nanometer-sized region in a range of 2.0 nanometers to 10 nanometers. In another embodiment, the nanometer-sized tip 210 may be positioned a perpendicular distance from the top surface of the nanometer-sized region in a range of 10 nanometers to 20 nanometers to ensure that the exponential signal is measured before the exponential signal decays.

The localization of the probing by the nanometer-sized tip 210 to the nanometer-sized region as well as the exponential signal being generated by the surface plasmons tunneling from the material layer 160 through the nanometer-sized region of the target material 150 may prevent the optical probe 170 from measuring exponential signals generated by surface plasmons tunneling through other portions of the target material 150 that are outside of the nanometer-sized region. The tunneling from outside the nanometer-sized region may be limited due to the optical probe 170 being sloped on it its sides thereby any nanometer-sized region positioned on the sides of the optical probe 170 receive exponentially less tunneling current. Thus, the exponential signals generated by surface plasmons tunneling through other portions of the target material 150 that are outside of the nanometer-sized region may decay significantly before reaching the nanometer-sized tip 210 that is localized to the nanometer-sized region and may not be measured by the optical probe 170. Thus, the nanometer-sized tip 210 may be positioned a perpendicular distance from the top surface of the nanometer-sized region such that the optical probe is prevented from measuring exponential signals associated with surface plasmons that tunnel from outside the nanometer-sized region.

The optical property analyzer 105 may determine at least one optical property associated with the nanometer-sized region based on the exponential signal associated with the surface plasmons collected by the optical probe 170. The optical properties may identify a plurality of identification characteristics associated with the nanometer-sized region of the target material 150. The optical properties are properties of the nanometer-sized region of the target material 150 that result from the response of the nanometer-sized region of the target material 150 to the optical beam 130 such that the excited surface plasmons tunnel from the material layer 160 through the nanometer-sized region of the target material 150 and collected by the optical probe 170.

For example, every material has an index of refraction that is unique to the material where the index of refraction is in general a complex number with a real part that indicates how much the material bends light and an imaginary part that indicates how much the material absorbs light. Optical properties may include the index of refraction and/or any other kind of optical property that characterizes the response of the nanometer-sized region of the target material 150 to the optical beam 130 that excites surface plasmons at the material layer 160 that may be implemented to identify the nanometer-sized region of the target material 150 that will be apparent to those skilled in the relevant art(s) without departing from the spirit and scope of the disclosure.

The optical property analyzer 105 may be any type of processing (or computing) device as described above. For example, the optical property analyzer 105 may be a workstation, mobile device, computer, and cluster of computers, set-top box, or other computing device. The multiple modules may also be implemented on the same computing device, which may include software, firmware, hardware, or a combination thereof. Software may include one or more applications on an operating system. Hardware can include, but is not limited to, a processor, memory, and a graphical user interface ("GUI") display.

The optical property analyzer 105 may include a computing device 125 and a probe position controller 115. The computing device 125 may be any type of processing (or computing) device as described above. For example, the computing device 125 may be a workstation, mobile device, computer, and cluster of computers, set-top box, or other computing device. The multiple modules may also be implemented on the same computing device, which may include software, firmware, hardware, or a combination thereof. Software may include one or more applications on an operating system. Hardware can include, but is not limited to, a processor, memory, and a graphical user interface ("GUI") display.

The probe position controller 115 may control the position of the optical probe 170. The probe position controller 115 may be any type of processing (or computing) device as described above. For example, the probe position controller 115 may be a workstation, mobile device, computer, and cluster of computers, set-top box, or other computing device. The multiple modules may also be implemented on the same computing device, which may include software, firmware, hardware, or a combination thereof. Software may include one or more applications on an operating system. Hardware can include, but is not limited to, a processor, memory, and a graphical user interface ("GUI") display.

Examples of the functionality performed by the optical property analyzer 105, the computing device 125, and the probe position controller 115 are referenced above as well as below in the discussion. However, the above and below references are examples and are not limiting. The functionality of the optical property analyzer 105, the computing device 125, and the probe position controller 115 may be performed individually by each of the optical property analyzer 105, the computing device 125, and the probe position controller 115 and/or shared among any combination of controllers and/or computing devices. Further, the functionality of the optical property analyzer 105, the computing device 125, and the probe position controller 115 may be performed individually by the optical property analyzer 105, the computing device 125 and the probe position controller 115, respectively, and/or shared among any combination of the optical property analyzer 105, the computing device 125, and the probe position controller 115. A user may implement the computing device 125 to instruct the probe position controller 115 as to the functionality that the probe position controller 115 is to execute. For example, the probe position controller 115 may position the optical probe 170 to raster the target material 150 while the computing device 125 analyzes the pixel data obtained by the rastering of the optical probe 170 and determines the optical properties of the target material 150 and/or any other combination thereof. For simplicity, the optical property analyzer 105 may be referenced as executing the functionality referenced above as well as below in the discussion and/or a combination of the probe position controller 115 and the computing device 125. However, the probe position controller 115 and/or the computing device 125 may be interchangeable in executing the referenced functionality.

The optical property analyzer 105 may determine the optical properties of the nanometer-sized region of the target material 150 based on the exponential signal that is measured by the optical probe 170 as the nanometer-sized tip 210 of the optical probe 170 is positioned over the nanometer-sized region of the target material 150. Rather than determining the identification characteristics associated with the nanometer-sized region independently in an empirical manner as executed in conventional approaches such as NSOM, the optical property analyzer 105 may determine the optical properties of the nanometer-sized region of the target material 115 from the exponential signal itself as function of the distance between the nanometer-sized tip 210 and the top surface of the target material 150 and thereby determine identification characteristics associated with the nanometer-sized region of the target material 150. Identification characteristics associated with the nanometer-sized region assist in identifying the nanometer-sized region, such as the chemical structure of the nanometer-sized region of the target material 150, and may assist in identifying the type of material included in the nanometer-sized region of the target material 150.

For example, the nanometer-sized tip 210 of the optical probe 170 may localize the probing within the nanometer-sized region of a biomedical sample and the optical probe 170 measures the exponential signal that is generated from the surface plasmons tunneling from the material layer 160 and through the nanometer-sized region of the biomedical sample to the optical probe 170. The optical property analyzer 105 may determine from the exponential signal the index of refraction associated of the nanometer-sized region of the biomedical sample. From the index of refraction, the optical property analyzer 105 may determine the chemical structure of the nanometer-sized region of the biomedical sample and identify the nanometer-sized region of the biomedical sample as being a specific protein.

The probe position controller 115 may determine a perpendicular distance that the nanometer-sized tip 210 of the optical probe 170 is positioned from a surface of the nanometer-sized region of the target material 150 based on the exponential signal measured by the optical probe 170 that is associated with the nanometer-sized region. As noted above, the intensity of the exponential signal is dependent upon the perpendicular distance of the nanometer-sized tip 210 from the top surface of the nanometer-sized region of the target material 150. The probe position controller 115 may determine the perpendicular distance that the nanometer-sized tip 210 of the optical probe 170 is position from surface of the nanometer-sized region of the target material 150 based on intensity of the exponential signal.

The probe position controller 115 may also determine the perpendicular distance that the nanometer-sized tip 210 of the optical probe 170 is positioned from a surface of the nanometer-sized region of the target material 150 by monitoring an intensity level of the exponential signal when the nanometer-sized tip 210 of the optical probe 170 localizes the probing within the nanometer-sized region. As noted above, the exponential signal is an exponential with regard to the perpendicular distance that the nanometer-sized tip 210 is from a top surface of the nanometer-sized region of the target material 150. A change in the perpendicular distance of the nanometer-sized tip 210 from the top surface of the nanometer-sized region may result in an increased sensitivity of the intensity level of the exponential signal to any change in the perpendicular distance and may result in a significant change in the intensity level of the exponential signal. The probe position controller 115 may monitor the intensity level of the exponential signal for any change in the intensity level. A change in the intensity level of the exponential signal may be the result of a change in the perpendicular distance of the nanometer-sized tip 210 from the top surface of the nanometer-sized region.

The probe position controller 115 may then adjust the perpendicular distance that the nanometer-sized tip 210 is positioned from the top surface of the nanometer-sized region when the intensity level of the exponential signal changes as any change in the intensity level of the exponential signal may be the result of a change in the perpendicular distance. The probe position controller 115 may adjust the perpendicular distance when the intensity level of the exponential signal changes such that the intensity level of the exponential signal moves back to its original intensity level. Thus, the probe position controller 115 may monitor the intensity level of the exponential signal to maintain the intensity level of the exponential signal at a constant level and then adjust the perpendicular distance such that the intensity level of the exponential signal is maintained at a constant level when the intensity level of the exponential signal changes. In maintaining the intensity level of the exponential signal at a constant level, the probe position controller 115 may also maintain the perpendicular distance of the nanometer-sized tip 210 from the top surface of the nanometer-sized region at a constant distance and thus the perpendicular distance of the nanometer-sized tip 210 from the top surface of the nanometer-sized region may be determined by the probe position controller 115 from the exponential signal itself.

The optical property analyzer 105 may then determine the at least one optical property associated with the nanometer-sized region based on the functional dependence of the change in the perpendicular distance on the change in the intensity level of the exponential signal measured by the optical probe 170 that is associated with the nanometer-sized region. As noted above, the optical property analyzer 105 may determine the optical properties from the exponential signal itself rather than determining the local identification characteristics of the target material 150 independently in an empirical manner in conventional approaches such as NSOM. In doing so, the probe position controller 115 may vary the perpendicular distance of the nanometer-sized tip 210 of the optical probe 170 from the surface of the nanometer-sized region of the target material 150 to determine the optical properties from corresponding variation in the intensity level of the exponential signal.

For example, the optical property analyzer 105 may determine the optical property of the index of refraction of the nanometer-sized region of the target material 150 by incorporating the variation in the perpendicular distance of the nanometer-sized tip 210 of the optical probe 170 from the surface of the nanometer-sized region of the target material 150 corresponding to the variation in the intensity level of the exponential signal. In such an example, the exponential signal is varied by a factor that depends upon the index of refraction of the nanometer-sized region of the target material 150 and the variation in the perpendicular distance of the nanometer-sized tip 210 from the surface of the nanometer-sized region. In measuring the exponential signal by the optical probe 170 while varying the perpendicular distance that the nanometer-sized tip 210 is from the surface of the nanometer-sized region, the optical property analyzer 105 may also determine the index of refraction of the nanometer-sized region. From the index of refraction of the nanometer-sized region of the target material 150, the optical property analyzer 105 may then determine identification characteristics, such as the chemical structure, of the nanometer-sized region and thereby identify the nanometer-sized region.

In addition to having the nanometer-sized tip 210 of the optical probe 170 sized on the nanometer-scale, the perpendicular distance of the nanometer-sized tip 210 being positioned from the surface of the nanometer-sized region on the nanometer-scale, and the nanometer-sized region of the target material 150 that the nanometer-sized tip 210 is localized being on the nanometer-scale, the probe position controller 115 may also adjust the perpendicular distance of the nanometer-sized tip 210 from the surface of the nanometer-sized region on the nanometer-scale. In doing so, the probe position controller 115 may adjust the perpendicular distance of the nanometer-sized tip 210 from the surface of the nanometer-sized region by a fraction of a nanometer. In an embodiment, the probe position controller 115 may adjust the perpendicular distance of the nanometer-sized tip 210 by 0.01 nanometer. For example, the probe position controller 115 may adjust the perpendicular distance that the nanometer-sized tip 210 is from the surface of the nanometer-sized region from 5.05 nanometers to 5.06 nanometers.

Thus, all of the various approaches in measuring the exponential signal involve dimensions on the nanometer-scale such as the nanometer-sized tip 210, the perpendicular distance from the surface of the nanometer-sized region, the nanometer-sized region itself, and the adjusting of the perpendicular distance, may enable the optical property analyzer 105 to determine the optical properties of the nanometer-sized region. In an embodiment, the optical property analyzer 105 may determine an optical property of the nanometer-sized region down to 1.0 nanometer. In doing so, the probe position controller 115 may determine that the optical properties with a degree of accuracy that increases the likelihood that the probe position controller 115 may correctly identify the nanometer-sized region of the target material 150.

The determination of the optical properties of the nanometer-sized region of the target material 150 on the nanometer-scale may increase the likelihood that the optical property analyzer 105 may correctly identify the nanometer-sized region of the target material 150. As mentioned above, the target material 150 may have identification characteristics that differ throughout the target material 150. For example, the target material 150 may have regions that have identification characteristics at the molecular level that differ from other regions of the molecular level of the target material 150 such as a biomedical sample may have different proteins located in different positions of the target material 150.

In isolating the optical properties that are determined by the probe position controller 115 to the optical properties of the probed nanometer-sized region of the target material 150 and determining the optical properties on the nanometer-scale, the likelihood is increased that those optical properties are unique to the nanometer-sized region rather than including optical properties that are unique to other nanometer-sized regions. For example, conventional approaches may average the optical properties of a region of the target material. The average of optical properties for a region may very well include identification characteristics that differ amongst that region, such as the region includes two different proteins rather than a single protein. The average of optical properties for a region may also include empty space that is not even part of the target material 150. The average of optical properties for a region where the identification characteristics differ amongst the region and/or includes empty space may result in optical properties that are not accurate and may result in an inaccurate and/or inconclusive identification of the region of the target material.

Rather the optical property analyzer 105 may determine the optical properties of the nanometer-sized region such that there is an increased precision that the determined optical properties are unique to the nanometer-sized region and are not tainted by portions outside of the nanometer-sized region that have different identification characteristics and/or include empty space. In doing so, the probe position controller 115 may have an increased accuracy in determining the identification characteristics of the nanometer-sized region of the target material 150 and in turn have an increased accuracy in identifying the nanometer-sized region of the target material 150 itself.

In addition to determining the optical properties of the nanometer-sized region of the target material 150, a target material image of the target material 150 that depicts each of the nanometer-sized regions included in the target material 150 may be generated. High voltage levels may be applied to high-voltage electrodes included in the piezoelectric tubes 180 such that the piezoelectric tubes 180 may adjust to position of the nanometer-sized tip of the optical probe 170 in three-dimensional space. The optical fiber 190 may be bifurcated into a first branch 190a and the second branch 190b. The photons that have been converted from surface plasmons may propagate through the second branch 190b to the spectrometer 195 such that the photons may be analyzed by the spectrometer 195. The optical beam 130 may be multiple wavelength or single wavelength. The spectrometer 195 may analyze the Raman shifts, photoluminescence shifts and so on of the probed nanometer-sized region of the target material 150. In an embodiment, the multiple optical beam 130 of differing wavelengths may be launched through a transparent optical element simultaneously and/or sequentially.

The photons that have been converted from surface plasmons may also propagate through the first branch 190a of the fiber optic cable 190(a-b) to the detector 110. The detector 110 may be a photomultiplier tube (PMT), a semiconductor based detector and/or any type of photon detector that is capable of detecting a plurality of photons that are generated from the plurality of surface plasmons that tunnel from the material layer 160 through the nanometer-sized region and collected by the optical probe 170. The photons are converted from the plurality of surface plasmons as the surface plasmons tunnel into the metallic material that coats the optical probe 170. The photons propagate to the optical fiber 190(a-b) and then to the detector 110. The computing module 125 may then display the exponential signal of the nanometer-sized region based on the plurality of photons detected by the detector 110. The plurality of photons corresponds to the exponential signal for the nanometer-sized region initially measured by the optical probe 170 based on the surface plasmons that tunneled from the material layer 160 through the nanometer-sized region and collected by the optical probe 170. The computing module 125 may include any type of display device including but not limited to a touch screen display, a cathode ray tube (CRT) monitor, a liquid crystal display (LCD) screen, and/or any other type of display device that includes a display that will be apparent from those skilled in the relevant art(s) without departing from the spirit and scope of the present disclosure. The imaging of the nano-scale regions of the target material 150 is discussed in detail below.

Rastering the Target Material Image of the Target Material

Figure 3:
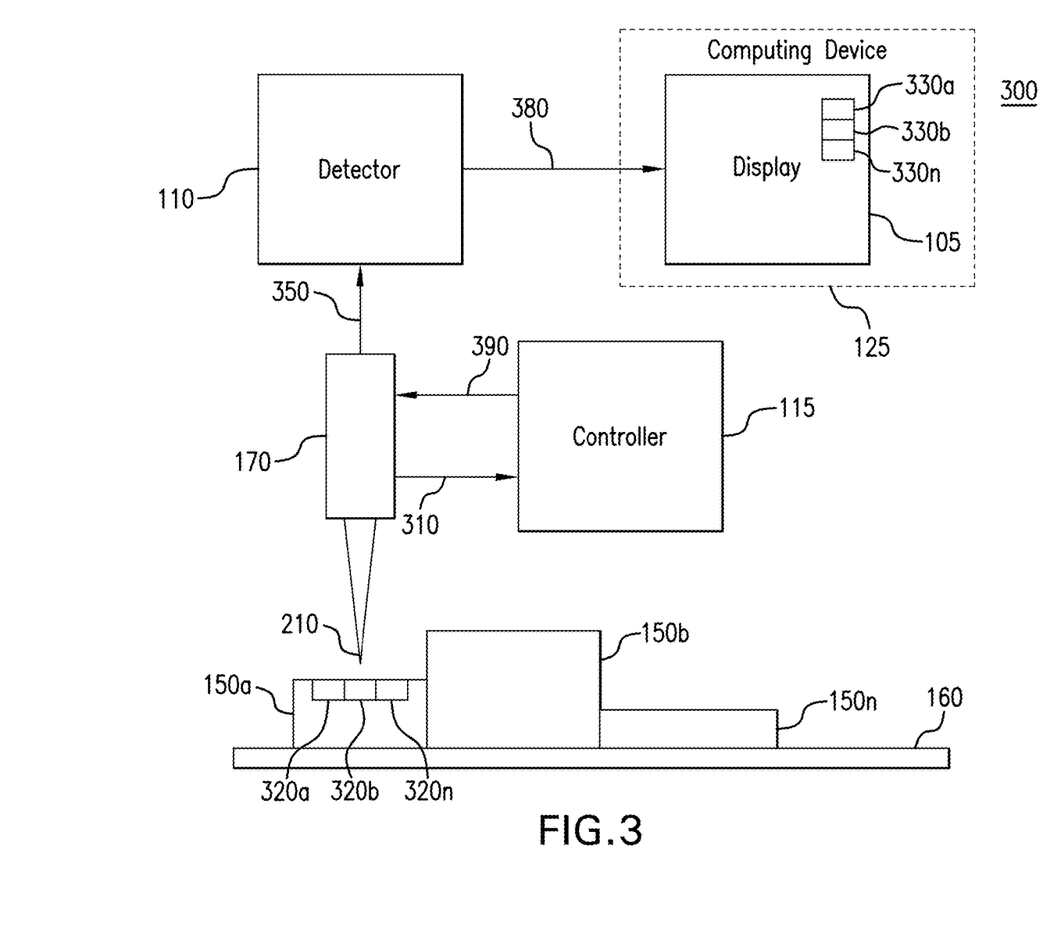
FIG. 3 illustrates a block diagram of a rastering configuration that may be used to raster the target material image of nanometer-sized regions of the target material according to an exemplary embodiment of the present disclosure.

FIG. 3 illustrates a block diagram of a rastering configuration 300 that may be used to raster the target material image of nanometer-sized regions of the target material 150. In addition to determining the optical properties of the nanometer-sized regions of the target material 150, a target material image of the nanometer-sized regions of the target material 150 may be generated. In doing so, the spatial resolution of the target material image may be provided by the localization of the optical probe 170 for each corresponding nanometer-sized region of the target material 150. Each exponential signal measured by the optical probe 170 for each corresponding nanometer-sized region differs, the spatial resolution of the target material image of the target material 150 also differs for each nanometer-sized region thereby providing contrast in the target material image for the nanometer-sized regions that have optical properties and/or thickness that differ from each other. The rastering configuration 300 shares many similar features with the SPSTM system 100; therefore, only the differences between the rastering configuration 300 and the SPSTM system 100 will be discussed in further detail.

The probe position controller 115 may position the nanometer-sized tip 210 of the optical probe 170 at each nanometer-sized region of a plurality of nanometer-sized regions 320(a-n), where n is an integer equal to or greater than two, so that the nanometer-sized tip 210 of the optical probe 170 is localized at each nanometer-sized region of the target material 150. The probe position controller 115 may generate a positioning signal 390 that adjusts the positioning of the nanometer-sized tip 210 of the optical probe 170. In order to generate the target material image of the target material 150, the probe position controller 115 may position the nanometer-sized tip 210 of the optical probe 170 via the positioning signal 390 such that the nanometer-sized tip 210 is localized at each of the different nanometer-sized regions 320(a-n) of the target material 150. In doing so, the optical probe 170 may measure the corresponding exponential signal for each of the nanometer-sized regions 320(a-n) as discussed in detail above.

The probe controller 115 may raster scan the nanometer-sized tip 210 over an area of the target material 150 to map pixel data generated by the computing device 125 from the electrical signal 380 associated with each nanometer-sized region 320(a-n) based on the exponential signal 350 associated with each nanometer-sized region 320(a-n) that is measured by the optical probe 170 when the optical probe 170 is localized at each nanometer-sized region 320(a-n) to a pixel 330(a-n), where n is an integer that corresponds to the quantity of nanometer-sized regions 320(a-n) of the target material 150, of a target material image that is displayed by the display 105. Each pixel 330(a-n) of the target material image displayed by the display 105 may correspond to the pixel data generated by the electrical signal 380 associated with each nanometer-sized region 320(a-n) converted by the detector 110 from the exponential signal 350 associated with each nanometer-sized region 320(a-n).

As noted above, the optical probe 170 may acquire the exponential signal 350 for the nanometer-sized region 320(a-n) where the nanometer-sized tip 210 is localized. The exponential signal 350 corresponds to photons that are converted from surface plasmons that tunnel through the nanometer-sized region 320(a-n) of the target material 150. The exponential signal 350 is then detected by the detector 110 and converted to an electrical signal 380. From the electrical signal 380, the computing device 125 may generate pixel data that is unique to the corresponding nanometer-sized region 320(a-n) which corresponds to a pixel of the resulting image.

The optical property analyzer 105 may then map the pixel data for each corresponding nanometer-sized region 320(a-n) to a corresponding pixel 330(a-n) of the displayed image. The pixel data 380 mapped to each corresponding pixel 330(a-n) by the probe position controller 115 via mapping pixel data signal 370 may be unique to the corresponding nanometer-sized region 320(a-n) due to the corresponding exponential signal 350 measured for each corresponding nanometer-sized region 320(a-n) of the target sample 150. For example, the nanometer-sized tip 210 of the optical probe 170 is localized at the first nanometer-sized region 320a of the target sample 150 and the optical probe 170 measures the exponential signal 350 for the nanometer-sized region 320a. The exponential signal 350 is then converted to an electrical signal 380 by the detector 110 and the electrical signal 380 is converted to pixel data by the computing device 125. Therefore, the pixel data 380 is unique to the nanometer-sized region 320a associated with the exponential signal 350 for the nanometer-sized region 320a and is mapped to the pixel 330a of the displayed image.

The probe position controller 115 may then position the nanometer-sized trip 210 of the optical probe 170 such that the nanometer-sized tip 210 moves from being localized at the nanometer-sized region 320a to being localized at nanometer-sized region 320b via the positioning signal 390. The optical probe 170 may then measure the exponential signal 350 for the nanometer-sized region 320b and the computing device 125 may map the pixel data that is unique to the nanometer-sized region 320a associated with the exponential signal 350 for the nanometer-sized region 320b to the pixel 330b of the displayed image. The probe position controller 115 may then raster the target sample 150 by positioning the nanometer-sized tip 210 of the optical probe 170 via the positioning signal 390 such that the optical probe 170 measures the exponential signal 350 for each nanometer-sized region 320(a-n) and maps the pixel data 380 that is unique to each corresponding nanometer-sized region 320(a-n) to the corresponding pixel 330(a-n) via the mapping pixel data signal 370. In doing so, the display 105 may display the pixel data 380 that is unique to each nanometer-sized region 320(a-n) via each corresponding pixel 330(a-n) as the target material image.

The display 135 may display the target material image with a spatial resolution corresponding to the nanometer-sized region 320(a-n) of the target material 150 so that the spatial resolution of each nanometer-sized region 320(a-n) as depicted in the target material image differs based on the pixel data 380 provided by each exponential signal 350 associated with each nanometer-sized region 320(a-n) that is measured by the optical probe 170. As noted above, the localization of probing within the nanometer-sized tip 210 to the corresponding nanometer-sized region 320(a-n) as well as the exponential signal 350 may prevent the optical probe 170 from measuring exponential signals 350 generated by other nanometer-sized regions 320(a-n). In decaying significantly before reaching the nanometer-sized tip 210, the optical probe 170 may be unable to measure the exponential signals 350 that are generated by other nanometer-sized regions 320(a-n) thereby resulting in the exponential signal 350 measured by the optical probe 170 and thus the corresponding pixel data being unique to the corresponding nanometer-sized region 320(a-n) where the nanometer-sized tip 210 of the optical probe 170 is localized.

In doing so, the pixel data 380 is unique to each corresponding nanometer-sized region 320(a-n) due to the corresponding exponential signal 350 measured by the optical probe 170 being unique to the corresponding nanometer-sized region 320(a-n). The uniqueness in the pixel data 380 for each corresponding nanometer-sized region 320(a-n) may provide spatial resolution in the target material image as displayed by the display 105 when the pixel data 380 specific to each nanometer-sized region 320(a-n) is mapped by the probe position controller 115 to the corresponding pixel 330(a-n) via the mapping pixel data signal 370. The spatial resolution in the target material image may provide contrast in the target material image such that the optical properties that differ for each nanometer-sized region 320(a-n) also differ in contrast in the target material image so that the differences in each of the nanometer-sized regions 320(a-n) may be observed due to the spatial resolution of the target material image. Further, the spatial resolution in the target material image may also provide contrast in the target material image such that the target material image depicts the target material 150 as a three-dimensional image.

In an embodiment, the probe position controller 115 may determine a perpendicular distance that the nanometer-sized tip 210 of the optical probe 170 is positioned from a surface of each nanometer-sized region of the target material 150 based on the exponential signal 350 for each nanometer-sized region 320(a-n) as measured by the optical probe 170. The probe position controller 115 may monitor the exponential signal 350 that is measured by the optical probe 170 via the exponential monitoring signal 310. As the probe position controller 115 rasters the target material 150, a thickness that the top surface of each nanometer-sized region 320(a-n) is positioned relative to the top surface of the transparent optical element 140 may differ. In order to maintain the localization of the nanometer-sized tip 210 of the optical probe 170 to the corresponding nanometer-sized region 320(a-n) when the thickness between the top surfaces of each nanometer-sized region 320(a-n) to the top surface of the transparent optical element 140 differ, the probe position controller 115 may monitor the exponential signal 350 for each corresponding nanometer-sized region 320(a-n) via the exponential monitoring signal 310 and adjust the perpendicular distance between the nanometer-sized tip 210 and the top surface of each corresponding nanometer-sized region 320(a-n) to maintain the localization, accordingly.

The probe position controller 115 may monitor an intensity level of the exponential signal 350 associated with each nanometer-sized region 320(a-n) that is measured by the optical probe 170 when the optical probe 170 is localized at each nanometer-sized region 320(a-n) to determine whether the exponential signal 350 is within an intensity level threshold. The intensity level threshold is a threshold for an intensity level of the exponential signal for the optical probe 170 to measure the exponential signal 350 before the exponential signal 350 is decayed. As noted above, the exponential signal 350 measured by the optical probe 170 when the optical probe 170 is localized at each nanometer-sized region 320(a-n) may have an intensity level and that intensity level may be monitored by the probe position controller 115 via the exponential monitoring signal 310.

The probe position controller 115 may adjust the perpendicular distance that the nanometer-sized tip 210 of the optical probe 170 is positioned relative to the surface of each nanometer-sized region 320(a-n) of the target material 150 as the optical probe 170 scans the target material 150 as a thickness associated with each nanometer-sized region 320(a-n) included in the target material 150 changes to maintain the intensity level of each corresponding exponential signal 350 as measured by the optical probe 170 within the intensity level threshold. The thickness is a height of the nanometer-scale region 320(a-n) from a surface of the nanometer-scale region 320(a-n) to a surface of the transparent optical element 140 opposite the surface of the nanometer-scale region 320(a-n).

The target sample 150 may have numerous portions 150(a-n), where n is an integer equal to or greater than two, that differ in thickness. For example, as shown in FIG. 3, the target sample 150 includes portions 150(a-n) where the nanometer-sized regions 320(a-n) included in each of the portions 150(a-n) differ in thickness.

As the probe position controller 115 positions the optical probe 170 via the positioning signal 390 to raster the target material 150 to generate the target material image, the probe position controller 115 may maintain the perpendicular distance of the nanometer-sized tip 210 of the optical probe 170 to each corresponding nanometer-sized region 320(a-n) such that the nanometer-sized tip 210 is positioned over each corresponding nanometer-sized region 320(a-n). However, the thickness of each of the nanometer-sized regions 320(a-n) may differ such that as the probe position controller 115 positions the optical probe 170 via the positioning signal 390 to raster the target material 150, probe position controller 115 may also adjust the perpendicular distance of the nanometer-sized tip 210 of the optical probe 170 via the positioning signal 390 to maintain the localization of the nanometer-sized tip 210 to each corresponding nanometer-sized region 320(a-n) as the thickness of each corresponding nanometer-sized region 320(a-n) changes.

For example, as shown in FIG. 3, the probe position controller 115 initially begins rastering the target material 150 by positioning the nanometer-sized tip 210 such that the nanometer-sized tip 210 is positioned over each of the nanometer-sized regions 320(a-n) included in the first portion 150a of the target sample 150 where each of the nanometer-sized regions 320(a-n) included in the first portion 150a of the target sample have a first thickness. However, the nanometer-sized regions 320(a-n) included in the second portion 150b of the target material 150 have a second thickness that differ from the first thickness of the nanometer-sized regions 320(a-n) included in the first portion of the target material 150a. Thus, the probe position controller 115 via the positioning signal 390 adjusts the perpendicular distance of the nanometer-sized tip 210 to account for the difference in the second thickness of the nanometer-sized regions 320(a-n) included in the second portion 150b of the target material 150 from the first thickness of the nanometer-sized regions 320(a-n) included in the first portion 150a of the target material 150. In doing so, the probe position controller 115 maintains the localization of the nanometer-sized tip 210 to the nanometer-sized regions 320(a-n) included in the second portion 150b of the target material 150 despite the change in the second thickness from the first thickness.

The probe position controller 115 may monitor the intensity level of the exponential signal 350 of each corresponding nanometer-sized region 320(a-n) via the intensity level signal 310 to determine whether the intensity level of the exponential signal 350 of each corresponding nanometer-sized region 320(a-n) deviates from the intensity level threshold. As noted above, the exponential signal 350 is an exponential where the power of the exponential is a function of the perpendicular distance that the nanometer-sized tip 210 is from a top surface of the nanometer-sized region 320(a-n) of the target material 150. A change in the perpendicular distance of the nanometer-sized tip 210 from the top surface of the nanometer-sized region 320(a-n) may result in an increased sensitivity to the intensity level of the exponential signal 350 in that any change in the perpendicular distance may result in a significant change in the intensity level of the exponential signal. The probe position controller 115 may monitor the intensity level of the exponential signal 350 via the intensity level signal 310 for any change in the intensity level. A change in the intensity level of the exponential signal 350 may likely be the result of a change in the perpendicular distance of the nanometer-sized tip 210 from the top surface of the nanometer-sized region 320(a-n).

The probe position controller 115 may then adjust the perpendicular distance that the nanometer-sized tip 210 is positioned from the top surface of the nanometer-sized region 320(a-n) when the intensity level of the exponential signal 350 deviates from the intensity level threshold as any deviation of the intensity level of the exponential signal 350 that is outside of the intensity level threshold is likely the result of a change in the perpendicular distance of the nanometer-sized region 320(a-n) from the nanometer-sized tip 210. The probe position controller 115 may adjust the perpendicular distance when the intensity level of the exponential signal 350 is outside of the intensity level threshold to maintain the intensity level of the exponential signal 350 within the intensity level threshold.

Thus, the probe position controller 115 may monitor the intensity level of the exponential signal 350 via the intensity level signal 310 to maintain the intensity level of the exponential signal 350 at a constant level within the intensity level threshold and then adjust the perpendicular distance such that the intensity level of the exponential signal 350 is maintained within the intensity level threshold when the intensity level of the exponential signal 350 changes. In maintaining the intensity level of the exponential signal 350 within the intensity level threshold, the probe position controller 115 may also maintain the perpendicular distance of the nanometer-sized tip 210 from the top surface of the nanometer-sized region 320(a-n) at a constant distance.

For example, as shown in FIG. 3, the probe position controller 115 monitors the intensity level of the exponential signal 350 via the intensity level signal 310 as the probe position controller 115 positions the nanometer-sized tip 210 to raster the first portion 150a of the target material 150. The probe position controller 115 positions the nanometer-sized tip 210 at a first perpendicular distance from the nanometer-sized regions 320(a-n) included in the first portion 150a of the target material 150 to maintain localization due to the first thickness of the nanometer-sized regions 320(a-n) included in the first portion 150a of the target material 150. As the probe position controller 115 moves the nanometer-sized tip 210 to the second portion 150b of the target material 150, the thickness of the nanometer-sized regions 320(a-n) included in the second portion 150b of the target material 150 changes from the first thickness of the first portion 150a to the second thickness of the second portion 150b.

In doing so, the probe position controller 115 recognizes that the intensity level of the exponential signal measured for the nanometer-sized regions 320(a-n) included in the second portion 150b of the target material 150 deviates outside of the intensity level threshold via the intensity level signal 310. The probe position controller 115 then adjusts the perpendicular distance of the nanometer-sized tip 210 from the nanometer-sized regions 320(a-n) of the second portion 150b of the target material 150 via the positioning signal 390 such that the intensity level of the exponential signal 350 for the nanometer-sized regions 320(a-n) of the second portion 150b is moved back to the intensity level threshold. In doing so, the probe position controller 115 adjusts the perpendicular distance such that the nanometer-sized tip 210 continues to be positioned over the nanometer-sized regions 320(a-n) of the second portion 150b of the target material 150 as the probe position controller 115 continues to raster the second portion 150b.

The probe position controller 115 may raster the target material 150 by mapping pixel data associated with each nanometer-sized region 320(a-n) via the electrical signal 380 that is captured by the optical probe 170 with the spatial resolution of each nanometer-sized region 320(a-n) as depicted in the target material image that is not diffraction limited to the optical probe 170 due to the corresponding exponential signal 350 measured by the optical probe 170 for each nanometer-sized region 320(a-n). The spatial resolution of each nanometer-sized region 320(a-n) as depicted in the target material image may not be diffraction limited in that the spatial resolution may not be limited to the wavelength of the optical beam 130 that is launched into the transparent optical element 140 and/or the aperture of the nanometer-sized tip 210 of the optical probe 170.

As noted above, the exponential signal 350 is an exponential where the power of the exponential is a function of the perpendicular distance that the nanometer-sized tip 210 is from a top surface of the nanometer-sized region 320(a-n) of the target material 150. A change in the perpendicular distance of the nanometer-sized tip 210 from the top surface of the nanometer-sized region 320(a-n) may result in an increased sensitivity to the intensity level of the exponential signal 350 in that any change in the perpendicular distance may result in a significant change in the intensity level of the exponential signal. The increased sensitivity of the exponential signal 350 may enable the resulting spatial resolution of the target material image to not be diffraction limited to the wavelength of the optical beam 130 and/or the aperture of the nanometer-sized tip 210 of the optical probe 170.

The probe position controller 115 may raster the target material 150 by mapping pixel data 380 associated with each nanometer-sized region 320(a-n) via the mapping pixel data signal 370 with an increased sensitivity to each change in the perpendicular distance that the nanometer-sized tip 210 of the optical probe 170 is positioned from the surface for each corresponding nanometer-sized region 320(a-n) as the optical probe 170 scans the target material 150. Each change in the perpendicular distance for each corresponding nanometer-sized region 320(a-n) may trigger an exponential change in the corresponding exponential signal 350 resulting in an increased sensitivity of the spatial resolution of the target material image.

Figure 4:
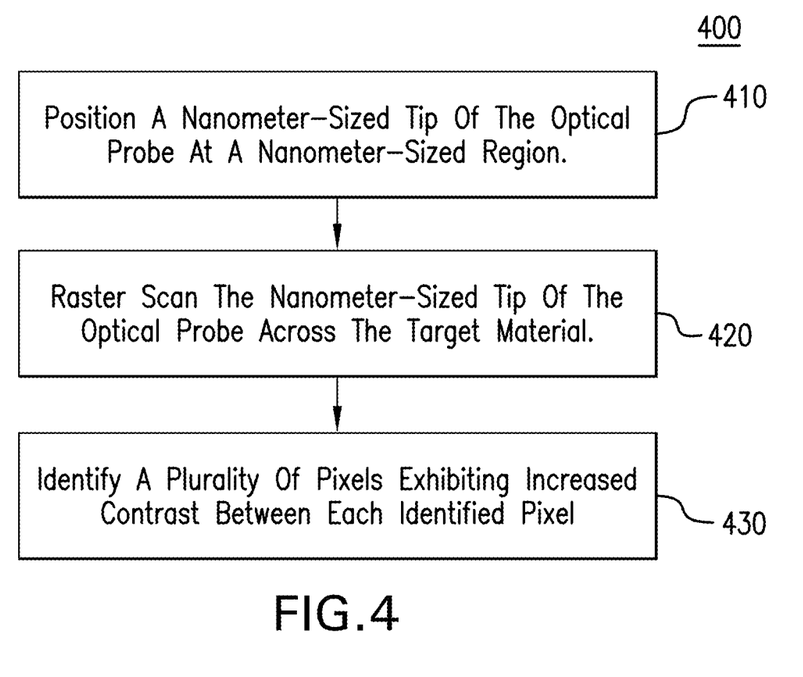
FIG. 4 is a flowchart of exemplary steps of positioning the optical probe via the positioning signal to raster the target material to generate the target material image according to an exemplary embodiment of the present disclosure.

One such implementation of positioning the optical probe 170 via the positioning signal 390 to raster the target material 150 to generate the target material image is illustrated by process 400 in FIG. 4. Process 400 includes three primary steps: position a nanometer-sized tip of the nano-sized probe at a nanometer-sized region 410, raster scan the nanometer-sized tip of the optical probe across the target material 420, and identify a plurality of pixels exhibiting increased contrast between each identified pixel. Steps 410-430 are typically implemented in a computer, e.g., via software and/or hardware, e.g., probe position controller 115 and/or computing device 125 of FIG. 3.

In step 410, the nanometer-sized tip 210 of the optical probe 170 at the nanometer-sized region 320a. The nanometer-sized region 320a may be a region of interest in the first portion 150a of the target material 150 where the optical properties of the nanometer-sized region 320a may be desired. The probe position controller 115 may position the nanometer-sized tip 210 of the optical probe 170 at a fixed (x, y) position on the top surface on the target material 150 where the fixed (x, y) position is the position of the nanometer-sized region 320a relative to the target material 150. The probe position controller 115 may scan the nanometer-sized tip 210 in a z position that is the perpendicular distance of the nanometer-sized tip 210 from the top surface of the nanometer sized region 320a to obtain the intensity level of the exponential signal 350 as a function relative to the perpendicular distance position of the nanometer-sized tip 210 in position z. In an example embodiment, step 410 may be performed by the probe position controller 115.

After the nanometer-sized tip 210 of the optical probe 170 is positioned at the nanometer-sized region 320a, in step 420, the nanometer-sized tip 210 of the optical probe 170 is raster scanned across the target material 150. The position z of the nanometer-sized tip 210 from the top surface of the nanometer sized region 320a is selected to measure an appropriate intensity level of the exponential signal 350 based on Equation 2 provided below. The probe position controller 115 may raster scan the nanometer-sized tip 210 of the optical probe 170 while adjusting the position z of nanometer-sized tip 210 from the top surface of the target material 150 at the appropriate intensity level of the exponential signal 350. The obtained position z of the nanometer-sized tip 210 from the top surface of each nanometer-sized region 320(a-n) is mapped to a corresponding pixel 330(a-n) thereby creating an image. The contrast of the image arises from inhomogeneities in the optical properties that differ amongst the nanometer-sized regions 320(a-n) and the thickness that differs amongst the nanometer-sized regions 320(a-n). In an example embodiment, step 420 may be performed by the by the probe position controller 115.

In step 430, a plurality of pixels 330(a-n) may be identified that exhibit an increased contrast between each identified pixel 330(a-n). Probe position controller 115 may position the nanometer-sized tip 210 at each of the nanometer-sized regions 320(a-n) and measure the intensity level of the probe signal 350 while scanning position z. The computing device 125 may compare the functional dependence of the intensity level of the probe signal 350 based on the relative position z that indicates homogeneity in the optical properties of the target material 150. For example, for each nanometer-sized region 320(a-n) in the range of position where Equation 2 provides a substantially similar intensity level of the probe signal 350, the product ank is substantially equal and with the difference being a shift in position z, then obtained image is an accurate topography image where the contrast of the image represents the thickness of the target material 150. However, if on the other hand, the product ank differs for each nanometer-sized region 320(a-n), then the optical properties differ and the computing module 125 may determine the optical properties and thickness of each nanometer-sized region 320(a-n) by fitting the measured intensity level of the probe signal 350 as a function of position z in model, $$I=I(z), \text{ where} \qquad (1)$$

I=is the intensity level of the probe signal, and
z=is the perpendicular distance of the nanometer-sized tip to top surface.

The dependence of the intensity level I on the position z may also be measured by methods other than linearly scanning the position z, such as varying the position z around an operation point at specified frequencies and detecting I using lock-in techniques. In an example embodiment, step 430 may be performed by the computing device 125.

Steps 410-430 may be repeated for each nanometer-sized region 320(a-n) such that the nanometer-sized tip 210 may be moved to the subsequent nanometer-sized regions 320 (a-n) yet to be raster scanned until the raster scan of the target material 150 is completed. The pixel data obtained and/or calculated by the computing module 125 may mapped to a corresponding pixel 330(a-n) to form an image of the target material 150. The raster scan may also be performed by maintaining the perpendicular distance of the nanometer-sized tip 210 from the top surface of the target material 150 (position z) constant while the intensity level of the corresponding exponential signal 350 varies depending upon the thickness of the corresponding nanometer-sized region 320(a-n). Steps 410-430 may then be executed to obtain corresponding pixel data based on the varying in the intensity level of the exponential signal 350 rather than the varying of the position z of the nanometer-sized tip 210 as the nanometer-sized tip 210 raster scans the target material 150. The obtained pixel data from the varying of the intensity level of the exponential signal 350 may then be mapped to the corresponding pixels 330(a-n) to generate the image with the appropriate contrast between the pixels 330(a-n).

The exponential signal 350 as measured by the optical probe 170 for each nanometer-sized region 320(a-n) is described by the model depicted in Equation 1 above where I is the intensity level of the exponential signal 350 and z is relative position of the direction perpendicular to the top surface of the material layer 150. In general, the optical properties and thickness of each nanometer-sized region 320(a-n) may be obtained by fitting the measured dependence of the intensity level, I, of the exponential signal 350 on the position z. For each nanometer-sized region of the target material 150, there is a range of z, where the model of Equation 1 may be expressed as $$I=I_0 e^{-ankz}, \text{ where} \qquad (2)$$

I = the intensity level of the exponential signal,
$I_0$ = a pre-factor,
n = the real part of the index of refraction of the target material in the nanometer-sized region,
k = $2\pi/\lambda$ is the free-space wavelength of the optical beam with $\lambda$ being the free-space wavelength,
a = a parameter that depends on the materials and geometry of the transparent optical element, the material layer, the target material, and the nanometer-sized tip of the optical probe, and
z = the perpendicular distance of the optical probe from the nanometer-sized region.

In the range of the position z of the nanometer-sized tip 210 where Equation 1 is valid any change in the position z may result in a significant change in the intensity level I of the exponential signal 350. For regions with homogeneous optical properties and differences in thickness of the target material 150 the maintaining of the intensity level I of the exponential signal 350 the position z of the nanometer-sized tip 210 from the top surface of the nanometer-sized region to be constant. Therefore, raster scanning with a contestant intensity level of the exponential signal 350 may result in a topography image of the target material 150.

For a more general target material 150 with inhomogeneous optical properties, however, the contrast of an image acquired by constant intensity raster scanning is due to the variations in both the thickness and the optical properties, such as the n as the real part of the index of refraction. Such a constant intensity raster scanned image may indicate degrees of inhomogeneity of the target material 150, while the exact values of the optical properties and thickness of each nanometer-sized region, such as the pixel 330(a-n) in the image, may be obtained from the intensity level of the exponential signal 350 as function of the relative position z of the nanometer-sized tip 210 measured by scanning the nanometer-sized tip 210 in a direction perpendicular to the top surface of the target material 150 of a nanometer-sized region 320(a-n). The wave vector k of the optical beam 130 launched into the transparent optical element 140 launched into the transparent optical element 140 by the optical beam source 120 is known, thus, the product of an in Equation 2 may be determined. The parameter a may be inferred from the materials and geometry of the configuration and therefore the real part of the index of refraction, n, may be determined.

More generally, the intensity level of the exponential signal 350 as a function of the position z of the nanometer-sized tip 210 may be measured by scanning the nanometer-sized tip 210 in the direction perpendicular to the top surface of the target material 150 the nanometer-sized region 320(a-n) in a range of position z beyond where Equation 1 is valid. The optical properties and thickness of each probed nanometer-sized region 320(a-n) may then be determined by fitting the measured intensity level of the exponential signal 350 as function of the relative position z to the model provided in Equation 1.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A Surface Plasmon Scanning-Tunneling Chemical Mapping (SPSTM) system, comprising:

an optical beam source configured to launch an optical beam through a transparent optical element at a surface plasmon excitation angle to a material layer that is positioned on the transparent optical element to excite a plurality of surface plasmons of the material layer;

an optical probe with a nanometer-sized tip configured to measure a probe signal associated with the surface plasmons that tunnel from the material layer through a nanometer-sized region of a target material and collected by the optical probe, wherein the nanometer-sized tip is localized to the nanometer-sized region when the optical probe is prevented from measuring probe signals associated with surface plasmons that tunnel from outside of the nanometer-sized region; and an optical property analyzer configured to determine at least one optical property associated with the nanometer-sized region based on the probe signal associated with the surface plasmons collected by the optical probe, wherein the optical properties identify a plurality of identification characteristics associated with the nanometer-sized region of the target material.

2. The SPSTM system of claim 1, wherein the optical property analyzer is further configured to:

control a position of the nano-meter sized tip of the optical probe;

determine a dependence of an intensity level of the probe signal relative to a position of the nano-sized tip of the optical probe as the nano-sized tip is moved in a direction that is perpendicular to a surface of the material layer;

determine from the dependence of the intensity level of the probe signal relative to the position of the nano-sized tip of the optical probe the at least one optical property associated with the nanometer-sized region; and display the probe signal associated with the nanometer-sized region based on a plurality of photons detected by the detector, wherein the plurality of photons is generated from the surface plasmons that tunnel from the material layer through the nanometer-sized region and collected by the optical probe.

3. The SPSTM system of claim 1, further comprising:

a detector configured to detect the plurality of photons that is generated from the plurality of surface plasmons that is tunneled from the material layer through the nanometer-sized region and collected by the optical probe.

4. The SPSTM of claim 3, wherein the optical property analyzer is further configured to:

position the optical probe at each nanometer-sized region of a plurality of nanometer-sized regions of the target material so that the probing is localized at each nanometer-sized region of the target material;

raster the nanometer-sized tip of the optical probe over the target material and map pixel data associated with each nanometer-sized region based on the probe signal associated with each nanometer-sized region that is measured by the optical probe when the nanometer-sized tip is localized at each nanometer-sized region to a pixel of a target material image that is displayed by the optical property analyzer, wherein each pixel of the target material image corresponds to pixel data associated with each nanometer-sized region based on the probe signal associated with each nanometer-sized region.

5. The SPSTM of claim 4, wherein the optical property analyzer is further configured to:

display an image of the target material as the nanometer-sized tip is rastered at a spatial resolution of the target material image that depicts each nanometer-sized region of the target material as the pixel so that each nanometer-sized region as depicted in the target material image differs based on the pixel data provided by each probe signal associated with each nanometer-sized region that is measured by the optical probe.

6. The SPSTM system of claim 5, wherein the optical property analyzer is further configured to:

determine a perpendicular distance that the nanometer-sized tip of the optical probe is positioned from a surface of each nanometer-sized region of the target material based on the probe signal for each nanometer-sized region as measured by the optical probe; and adjust the perpendicular distance that the nanometer-sized tip of the optical probe is positioned from the surface of each nanometer-sized region of the target material to maintain the localization of the nanometer-sized tip to each corresponding nanometer-sized region of the target material that the optical probe is measuring the probe signal.

7. The SPSTM system of claim 6, wherein the optical property analyzer is further configured to:

monitor an intensity level of the probe signal associated with each nanometer-sized region that is measured by the optical probe when the perpendicular distance that the nanometer-sized tip of the optical probe is positioned from the surface of each nanometer-sized region of the target material is varied; and determine the at least one optical property and a thickness of each nanometer-sized region of the target material based on a dependence of an intensity level of the probe signal on the perpendicular distance that the nanometer-sized tip of the optical probe is positioned from the surface of each nanometer-sized region of the target material.

8. The SPSTM system of claim 5, wherein the optical property analyzer is further configured to raster the nanometer-sized tip over the target material and map the pixel data associated with each nanometer-sized region at the spatial resolution that is not diffraction limited.

9. The SPSTM system of claim 5, wherein the optical property analyzer is further configured to:

raster the nanometer-sized tip of the optical probe over the target material and map the pixel data associated with each nanometer-sized region as the pixel with an increased sensitivity to each variation in the perpendicular distance that the nanometer-sized tip of the optical probe is positioned from the surface of each corresponding nanometer-sized region, wherein each variation in the perpendicular distance for each corresponding nanometer-sized region triggers an increased variation in the pixel data resulting in the increased sensitivity of each pixel of the target material image.

10. The SPSTM system of claim 9, wherein the optical property analyzer is further configured to:

display a map of each optical property determined for each nanometer-sized region of the target material as a corresponding pixel of the map; and display the map of the thickness of each nanometer-sized region of the target material as a corresponding pixel of the map.

11. A method for identifying a target material based on optical properties of the target material that are determined from surface plasmons that tunnel from a material layer through the target material to an optical probe, comprising:
launching an optical beam into a transparent optical element through a transparent optical element at a surface plasmon excitation angle to the material layer that is positioned on the transparent optical element;
exciting a plurality of surface plasmons of the material layer;
positioning a nanometer-sized tip of the optical probe so that the nanometer-sized tip is localized to a nanometer-sized region of the target material;
measuring a probe signal associated with the surface plasmons that tunnel from the material layer through the nanometer-sized region of the target material and collected by the optical probe, wherein the nanometer-sized tip is localized to the nanometer-sized region when the optical probe is prevented from measuring probe signals associated with surface plasmons that tunnel from outside of the nanometer-sized region; and
determining at least one optical property associated with the nanometer-sized region based on the probe signal associated with the surface plasmons collected by the optical probe, wherein the optical properties identify a plurality of identification characteristics associated with the nanometer-sized region of the target material.

12. The method of claim 11, further comprising:
controlling a position of the nanometer-sized tip of the optical probe;
determining a dependence of an intensity level of the probe signal relative to a position of the nano-sized tip of the optical probe as the nano-sized tip is moved in a direction that is perpendicular to a surface of the material layer; and
displaying the probe signal associated with the nanometer-sized region based on a plurality of photons detected by the detector, wherein the plurality of photons is generated from the surface plasmons that tunnel from the material layer through the nanometer-sized region and collected by the optical probe.

13. The method of claim 11, further comprising:
detecting the plurality of photons that is generated from the plurality of surface plasmons that is tunneled from the material layer through the nanometer-sized region and collected by the optical probe.

14. The method of claim 13, further comprising:
positioning the optical probe at each nanometer-sized region of a plurality of nanometer-sized regions of the target material so that the optical probe is localized at each nanometer-sized region of the target material;
rastering nanometer-sized tip of the optical probe over the target material and mapping pixel data associated with each nanometer-sized region based on the probe signal associated with each nanometer-sized region that is measured by the optical probe when the optical probe is localized at each nanometer-sized region to a pixel of a target material image that is displayed, wherein each pixel of the target material image displayed corresponds to pixel data associated with each nanometer-sized region based on the probe signal associated with each nanometer-sized region.

15. The method of claim 14, further comprising:
displaying an image of the target material as the nanometer-sized tip is rastered at a spatial resolution of the target material image that depicts each nanometer-sized region of the target material as the pixel so that each nanometer-sized region as depicted in the target material image differs based on the pixel data provided by each probe signal associated with each nanometer-sized region that is measured by the optical probe.

16. The method of claim 15, further comprising:
rastering the nanometer-sized tip over the target material and map the pixel data associated with each nanometer-sized region at the spatial resolution that is not diffraction limited.

17. The method of claim 15, further comprising:
rastering the nanometer-sized tip of the optical probe over the target material and map the pixel data associated with each nanometer-sized region as the pixel with an increased sensitivity to each variation in the perpendicular distance that the nanometer-sized tip of the optical probe is positioned from the surface of each corresponding nanometer-sized region, wherein each change in the perpendicular distance for each corresponding nanometer-sized region triggers an increased variation in the pixel data resulting in the increased sensitivity of each pixel of the target image.

18. The method of claim 17, further comprising:
displaying a map of each optical property determined for each nanometer-sized region of the target material as a corresponding pixel of the map; and
displaying the map of the thickness of each nanometer-sized region of the target material as a corresponding pixel of the map.

19. The method of claim 15, further comprising:
determining a perpendicular distance that the nanometer-sized tip of the optical probe is positioned from a surface of each nanometer-sized region of the target material based on the probe signal for each nanometer-sized region as measured by the optical probe;
adjusting the perpendicular distance that the nanometer-sized tip of the optical probe is positioned from the surface of each nanometer-sized region of the target material; and
maintaining the localization of the nanometer-sized tip to each corresponding nanometer-sized region of the target material that the optical probe is measuring the probe signal.

20. The method of claim 11, further comprising:
monitoring an intensity level of the probe signal associated with each nanometer-sized region that is measured by the optical probe when the perpendicular distance that the nanometer-sized tip of the optical probe is positioned from the surface of each nanometer-sized region of the target material is varied; and
determining the at least one optical property and a thickness of each nanometer-sized region of the target material based on a dependence of an intensity level of the probe signal on the perpendicular distance that the nanometer-sized tip of the optical probe is positioned from the surface of each nanometer-sized region of the target material.

* * * * *